Figure 1:
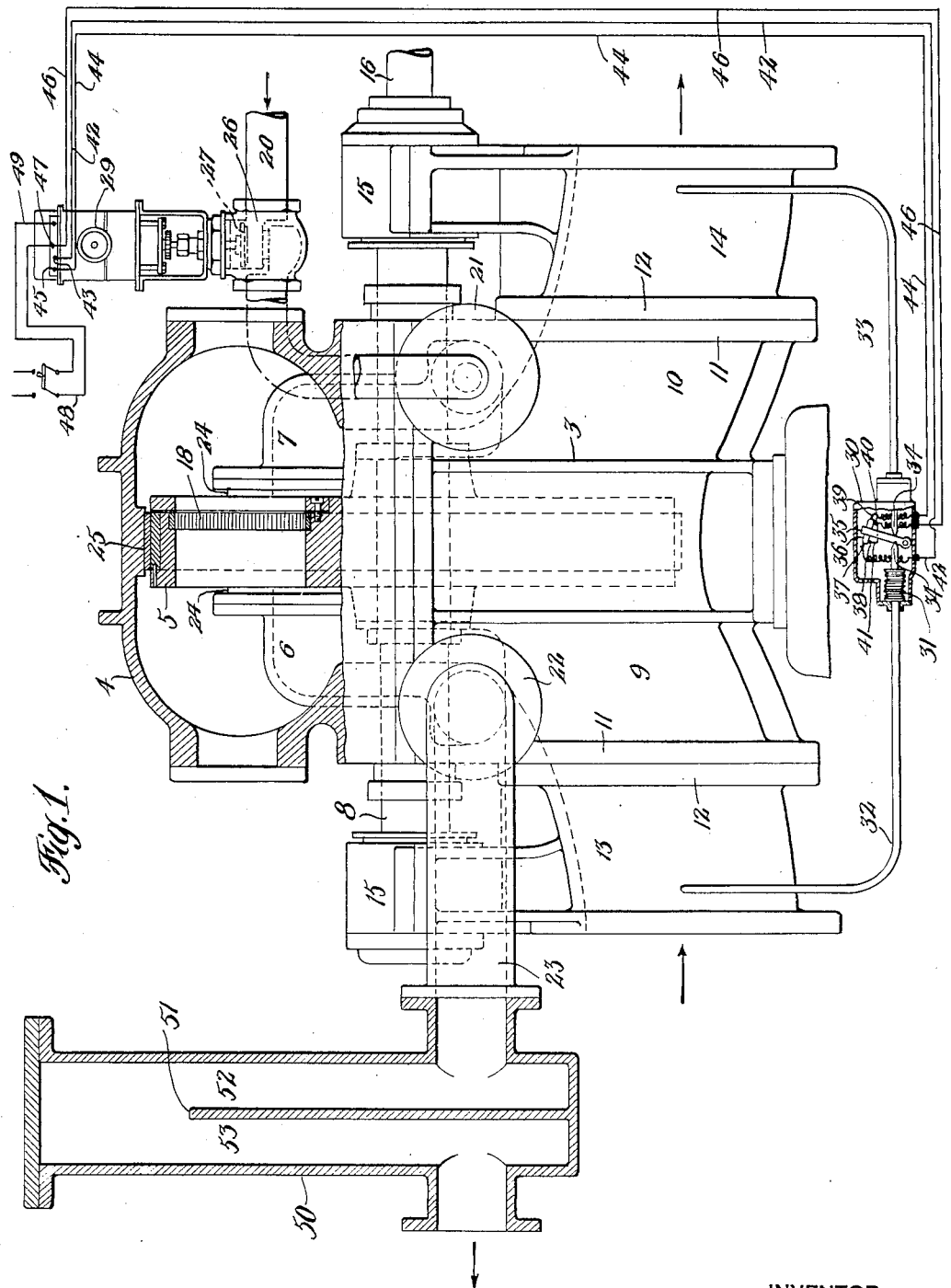

Dec. 19, 1939.                    D. R. McNEAL                    2,183,577
                               STRAINING EQUIPMENT
                           Filed April 30, 1936           3 Sheets-Sheet 1

INVENTOR
D. R. McNeal
BY
Synnestvedt & Lechner
ATTORNEYS

Dec. 19, 1939.  D. R. McNEAL  2,183,577
STRAINING EQUIPMENT
Filed April 30, 1936  3 Sheets-Sheet 3

INVENTOR
D. R. McNeal
BY
Synnestvedt & Lechner
ATTORNEYS

Patented Dec. 19, 1939

2,183,577

UNITED STATES PATENT OFFICE 2,183,577

STRAINING EQUIPMENT

Daniel Raymond McNeal, Abington, Pa., assignor to Andale Company, Philadelphia, Pa., a corporation of Pennsylvania Application April 30, 1936, Serial No. 77,110

8 Claims. (Cl. 210—152)

This application is a continuation in part of my copending application Serial No. 756,808, filed December 10, 1934, and the invention disclosed relates to continuously operating strainers, and particularly to strainers of this type wherein the straining element is composed of a plurality of sections which may be successively isolated and removed from service and cleaned by reversal of fluid flow without interruption of service through the balance of the straining sections. Such equipment may take various forms, but the best exemplification thereof is probably the rotary type of strainer, shown, for example, in my Patents Nos. 1,826,361 and 2,057,497, in view of which the invention disclosed herein will be shown and described as embodied in a rotary strainer of this kind.

The primary object of the invention is to provide straining equipment of this character which will be of more uniform straining capacity, that is, one in which the flow of fluid through the strainer will be maintained substantially constant, regardless of conditions.

It is also an object of the invention to obtain this uniformity of capacity by means of apparatus which is automatic in operation and which is directly controlled by means of the pressure drop between the two sides of the strainer. In other words, the conditions of operation are used to control the cleaning of the strainer.

Further objects of the invention are to provide a strainer which is more effective in its action, one which is easier and cheaper to manufacture, and one in which it is possible to use larger openings in the screening members or grids than would ordinarily be considered feasible for the character of the work to be done.

Another object of the invention is to provide a strainer having the foregoing advantages in which it is unnecessary to in any way valve or throttle the wash water discharge line as is customary in present strainers.

Still another object of the invention is to provide straining equipment of the character disclosed in which the cleaning fluid can be delivered under whatever pressure may be desirable to satisfactorily effect the cleaning operation. This feature is particularly advantageous in connection with installations where the cleaning fluid must be taken from the discharge side of the strainer because, in installations of this kind, it frequently happens that at the time there is the greatest demand for cleaning fluid there is very little available for such purpose.

More specifically stated, it is among the objects of my invention to provide either a valve or a pump or both, in the cleaning fluid supply line which are automatically controlled in accordance with the drop in pressure across the strainer.

Another object of the invention is to provide means for maintaining a positive pressure on the strained material so as to hold it against the straining element while said element is in the back-washing or cleaning zone during periods when cleaning is not desired or when cleaning is not being effected.

How the foregoing objects, together with such other objects as may appear hereinafter or are incident to my invention, are obtained is illustrated in a preferred form in the accompanying drawings, wherein—

Figure 1 is a side elevation of a rotary strainer embodying my invention, with certain portions shown in section.

Figure 2:
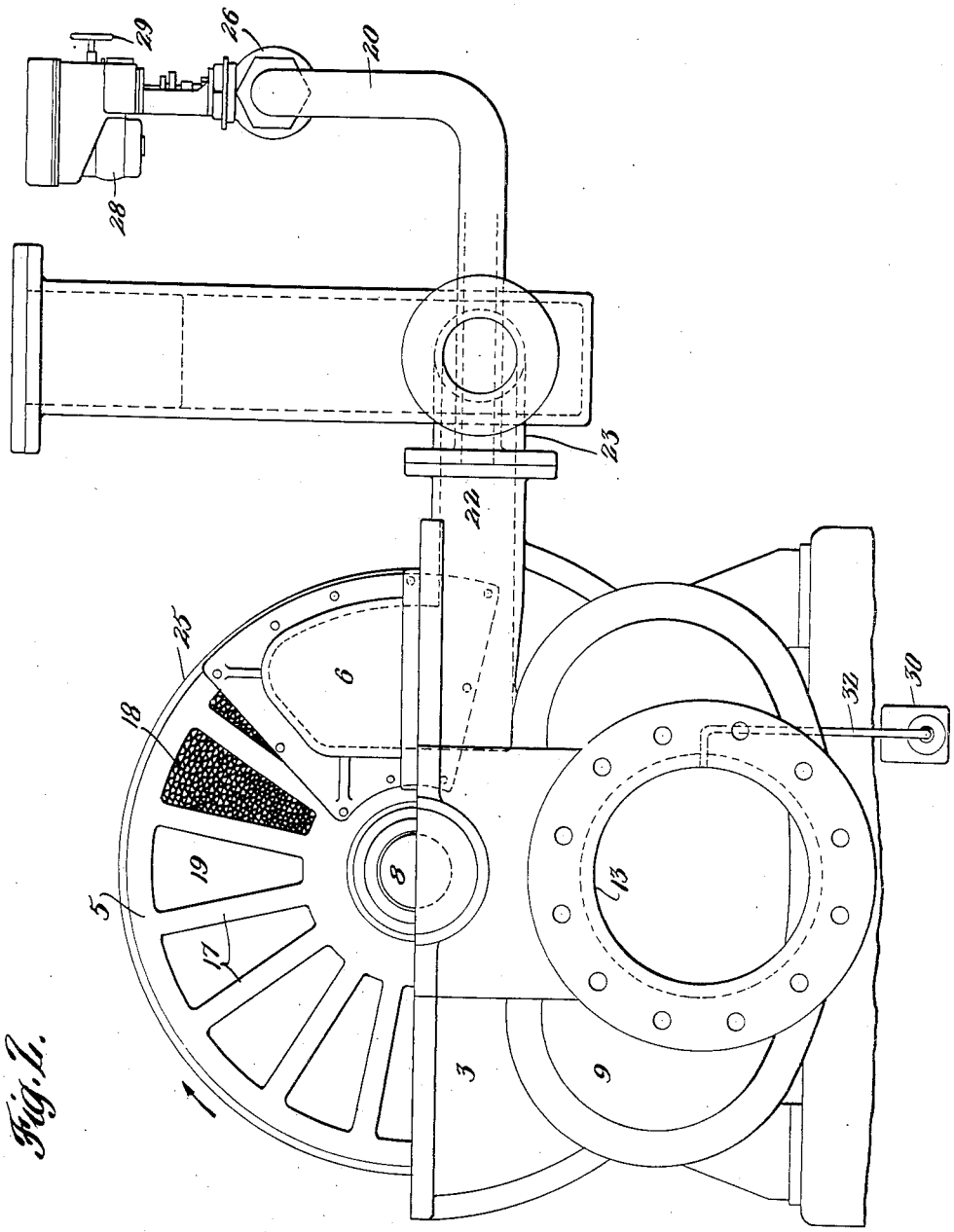
Figure 3:
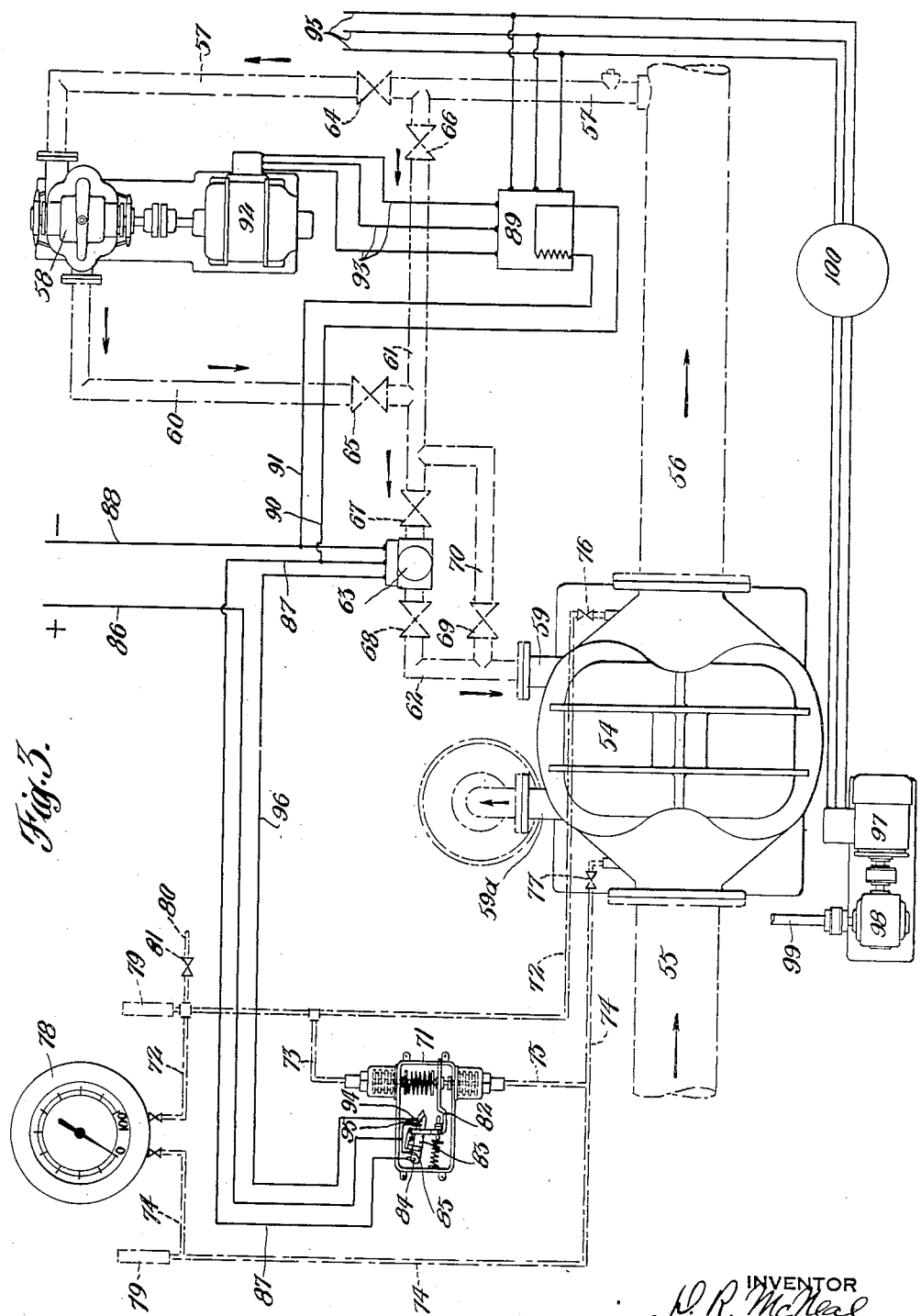

Figure 2 is an end view taken from the left of Figure 1, with the upper half of the strainer casing removed in order to more accurately disclose the construction, and Figure 3 is a diagrammatic illustration showing my invention as applied to straining equipment of the character described wherein both a valve and a pump are provided for controlling the flow of cleaning fluid through the cleaning fluid supply line.

Referring to the drawings and, in the first instance, particularly to Figures 1 and 2, it will be seen that the rotary strainer comprises in general a bottom casing 3, a top casing 4, a straining wheel 5, and a pair of oppositely-disposed clean-out boxes 6 and 7. The straining wheel 5 is mounted for rotation upon the shaft 8, which lies in the plane which divides the lower casing member 3 from the upper casing member 4.

The lower casing member is provided with an inlet section 9 and a corresponding outlet section 10, both of which are suitably flanged as at 11 to receive the complementary flanges 12 on the pipe connecting sections 13 and 14. The fluid to be cleaned enters from the left and is discharged from the right, as shown by the arrows in Figure 1, the straining taking place, of course, as the fluid passes through that portion of the straining wheel which is in line with the fluid flow in the annular chamber formed by the upper and lower casing members 3 and 4.

The shaft 8 is journaled in suitable bearings 15 and may be driven in any desired manner as by the shaft 16, the details of which are not illustrated inasmuch as they do not form any part of the present invention.

The straining wheel 5, as is more fully illustrated and described in my earlier Patent No. 2,057,497 above referred to, is provided with a series of spokes 17 between which are fitted the straining elements 18 of any suitable or desired character. In Figure 1, the straining elements 18 are shown as being located to the right of the center of the straining wheel 5 in order to provide a series of straining pockets 19 between the spokes 17, in which pockets the debris may collect.

The wheel rotates in the direction of the arrow shown in Figure 2 and, as the straining elements 18 in the pockets 19 are successively brought between the oppositely-disposed clean-out boxes 6 and 7, fluid may be applied in the reverse direction to wash or clean the straining elements, the cleaning fluid coming in through the pipe 20 which is connected to the wash water inlet portion 21 of the lower casing member 3. In turn, the portion 21, of course, through suitable passages in the casing, is connected with the box 7. Similarly, on the outlet side, the box 6 is connected to the outlet portion 22, which, in turn, discharges into the wash water discharge line 23.

The faces of the wheel 5 where they come opposite the clean-out boxes 6 and 7 are tightly sealed by means of suitable resilient or rubber gasket means 24, the nature and function of which are more fully illustrated and described in my Patent No. 2,057,497 above referred to. Suffice it to say for the present application that these sealing devices 24 effectively prevent leakage of fluid in either direction between the straining circulation and the wash circulation. Incidentally, the wheel 5 is sealed at its periphery by means of a suitable sealing device 25 so that fluid may not pass from one side to the other, except through the strainer. In other words, the fluid which is being strained enters at 13, passes through the straining wheel 5 over that area which is not opposite the cleaning boxes 6 and 7, and then leaves through the connection 14, and the wash fluid enters at 20, passes through the connection 21 and the box 7, from whence it traverses the straining element which is in position between the two boxes 6 and 7 in a direction opposite to that which takes place during the screening operation, and then outward through the box 6, the connection 22, and pipe 23.

The equipment so far described is now familiar to those skilled in the art and is known fundamentally as a rotary strainer. The specific improvements which form the invention of the present application will now be described.

In the wash water line 20 of Figures 1 and 2, I have introduced an ordinary globe valve 26, the valve member 27 of which is shown in open position in Figure 1. This valve member is motor driven by means of an electric motor 28 although, if so desired, it may be operated by hand through the medium of the hand wheel 29. Operation of the motor in one direction will open the valve 27 and in the opposite direction will close it, in a manner well understood in this art.

The drop in pressure between the two sides of the strainer is measured by means of any suitable hydraulic pilot mechanism shown for example at 30. This may consist of a Sylphon diaphragm or bellows 31 which is connected by means of a pipe 32 to the pressure on the inlet side 13 as illustrated to best advantage in Figure 1. A similar bellows diaphragm may be employed on the opposite side, and this may be connected to the discharge line 14 of the strainer by means of the pipe 33. Each Sylphon bellows may carry a fulcrum pin 34, which pins bear against a rocking member 35, one on each side, so that the position of the rocking member 35 may be determined by the drop in pressure between the inlet side 13 and the outlet side 14. In other words, when the drop in pressure is great, which would, of course, indicate that the strainer was becoming dirty, the arm 35 will be moved to the right, as shown, for example, in Figure 1. If the drop in pressure is not so great, the arm 35 will be moved over toward the left.

The arm 35 may carry a suitable form of switching mechanism such, for example, as a Mercoid switch 36, having an upper terminal 37 and a lower terminal 38 at one end, and an upper terminal 39 and a lower terminal 40 at the other end, the two lower terminals being connected together by a wire 41, as shown. The upper terminal 37 is connected by means of the wire 42 to one terminal 43 of the motor, and the other upper terminal 39 is connected by means of the wire 44 to the other terminal 45 of the motor. The two lower terminals 38 and 40 are connected by means of the wire 46 to one terminal 47 of the supply circuit 48—49.

By an arrangement of this kind or by means of any other suitable arrangement, it is possible to automatically control the flow of the wash water coming in through the pipe 20 in direct relation to the drop in pressure between the two sides of the strainer. As this drop in pressure becomes too great, or exceeds a certain predetermined maximum, the valve 27 will be opened in order to effect cleaning of the strainer in the manner already described. If the drop in pressure falls below a certain predetermined standard, the opposite motion of the valve 27 will take place and the valve will be closed so as to shut off the supply of cleaning fluid. When the valve reaches either one of its two positions the motor circuit is broken in accordance with well known principles in the art of motor actuated valves. In this way the capacity of the strainer is maintained substantially uniform by means of mechanism or apparatus which is under the direct control of the drop in pressure between the two sides of the strainer.

In order to still further maintain the uniformity of capacity already described, as well as in order to obtain other advantages enumerated at the beginning of this specification, I introduce into the wash water discharge line 23, a water seal or trap 50, which is arranged with respect to the clean-out box 6 in such a way as to prevent a complete emptying of the wash water discharge line. This is accomplished by locating the top of the plate 51 which divides the trap into the upwardly travelling side 52 and the downwardly travelling side 53 at a point above the level of the highest portion of the clean-out box 6, so that a small volume of the cleaning fluid is trapped in that portion of the discharge line which is defined by the box 6, the connections 22 and 23, and the passage 52. This avoids unrestrained dumping of the water and prevents too great a disturbance of the mat of debris which has accumulated on the straining elements 18 in the pockets 19 while said elements are in the cleaning or backwashing zone during periods when a cleaning operation is not being effected.

I have found that this arrangement is of much assistance in obtaining more uniform operation from the strainer because it makes possible the use of the debris itself as a straining medium which enables me to use a straining grid 18 of larger dimension or one having openings of larger size than would otherwise be possible in order to effect the desired straining action. This, of course, reduces the cost of manufacturing the strainer elements, enables me to make them stronger and more rugged because materials of greater dimension can be employed, and all of which, of course, simplifies the construction and makes it easier to maintain. Furthermore, with a grid having larger openings, it is more easy to wash away the debris and effect the necessary cleaning by a reversal of flow such as described. Incidentally, the invention makes possible an arrangement which requires no valving or throttling of the wash water discharge line, as is now necessary in strainers previously used in the art, the passages 52 and 53 being in no sense intended to restrict flow through the wash water discharge line, but merely to provide means for preventing sudden and complete removal of the debris by creating a slight pressure in the pockets 19 as they come into line with the oppositely-disposed boxes 6 and 7. In this way, I maintain a straining mat upon the straining elements or grids 8.

In the diagrammatic showing of Figure 3 the water or fluid to be strained enters the strainer 54 through the pipe 55 and leave it through the pipe 56, the strainer 54, preferably, being of the type already described in connection with Figures 1 and 2 and specifically claimed in my copending application Serial No. 657,586, above referred to.

Although not shown, I wish to call attention to the fact that equipment of this kind is generally provided with a main pump which can be located either in the delivery line 55 or in the discharge line 56, depending upon convenience or desire, and this without in any way changing the applicability of my invention.

The cleaning or washing fluid is taken from the discharge line 56 through the pipe 57 which delivers to what I refer to as a booster pump 58. The discharge from the pump 58, preferably, is delivered to the wash water inlet 59 on the strainer through the pipes 60, 61 and 62, an automatic control valve 63 being introduced for a purpose exactly similar to that illustrated in connection with Figure 1 and the details of which are essentially the same as that illustrated in the earlier figure. The cleaning water or fluid with its entrained debris leaves the strainer through the connection 59a which may, if desired, include a seal or trap 50 such as shown in Figure 1.

If desired, flow through the pump 58 may be by-passed by closing the valves 64 and 65 and opening the valve 66. Furthermore, the valve 63 may be by-passed by closing the valves 67 and 68 and opening the valve 69, which latter is located in the by-pass pipe 70.

It will be obvious, therefore, that control of the cleaning fluid may be obtained either through the medium of a pump 58 or through the medium of the valve 63, or through the medium of both combined as may be desired.

As before, I prefer to control the equipment automatically and to this end I have provided a pilot device 71 similar in all essential respects to the pilot device 30 shown in Figures 1 and 2, although its details are of slightly different form.

This pilot device is subject to the control of the drop in pressure across the strainer by means of pipe connections 72—73 and 74—75, the former of which comes from the discharge side of the strainer under the control of valve 76 and the latter of which comes from the inlet side of the strainer under the control of the valve 77.

The pipes 72 and 74 may be connected to a pressure gauge 78 for indicating the drop in pressure between the two sides of the strainer and the pipes 72 and 74 may be provided with suitable air chambers 79. A test pipe 80 is also provided but this is normally closed by the valve 81 except for purposes of test.

The details of the pilot device 71 do not form a part of the present invention so they will be only briefly described. Suffice it to say that when the drop in pressure between the two sides of the strainer exceeds a predetermined standard, which standard can be set or chosen as desired, the pilot device 71, which is essentially a mercoid switch of a type familiar in the art, will function to throw the arm 82 upwardly so as to tilt the mercury chamber 83 in the direction opposite to that shown in the drawings whereupon the mercury will flow to the left-hand end and connect the terminals 84 and 85, thus completing the circuit through the lines 86 and 87. This will actuate the motor 63 so as to open the valve which it controls and permit cleaning fluid to pass to the connection 59, the circuit being completed to the source of supply through the wire 88. At the same time the magnetic switch 89 will be energized by virtue of the wires 90 and 91 which are connected, respectively, to the wires 87 and 88. The motor 92 for driving the pump 58 is shown as being controlled by a suitable three wire system 93, the details of which will not be herein described because they are familiar to those skilled in the art and form no part of the present invention. When the magnetic switch 89 is energized the motor 92 will drive the pump 58 so as to deliver the cleaning fluid under whatever pressure may be desired, the speed of the motor 92 being controlled manually or automatically in any preferred manner.

Cleaning of the strainer will then proceed until such time as the predetermined differential in pressure as between the two sides of the strainer is again attained, whereupon the arm 82 will move downwardly or to the position shown in the drawings and the mercury will flow to the right-hand end of the tube 83 to connect the terminals 94 and 95. This will complete the circuit through the lines 86 and 96 so as to rotate the motor 63 in the opposite direction to close the valve which it controls, the current returning as before, through the wire 88 to the other side of the source of supply.

At the same time that this latter operation occurs, the circuit to the magnetic switch 89 will, of course, be broken so that the motor 92 and the pump 58 will cease to operate.

As before indicated, if desired, the valve controlled by the motor 63 (which is the same in function as that illustrated in Figures 1 and 2) may be dispensed with and the pump 58 alone used to control the supply of cleaning fluid, in which event the mercoid switch 83 may be of a simple make and break type which will serve in one position to complete the circuit for the motor 92 and in the other position to break it. I prefer, however, to employ both the pump 58 and the valve controlled by the motor 63 in combination.

The strainer 54 may be driven by a motor 97 through the medium of reduction gearing 98 and shaft 99, the circuit for the motor being connected to the line 93 under the control of any suitable motor starting device 100, but the details of this mechanism are not illustrated because they form no part of the present invention.

The arrangement makes it possible to deliver the cleaning fluid under whatever pressure may be necessary even in instances where the cleaning fluid is taken from the discharge side of the strainer 56 as shown, because the pump 53 will operate to boost the pressure to the requisite degree. This advantage is extremely important because as the drop in pressure becomes greater there is less and less water available for delivery either to the plant or to the back-washing circuit, and if the pump 53 were not provided it might very well happen that the strainer would become dirtier and dirtier until finally all flow would cease.

I claim:

1. In straining equipment wherein the straining element is composed of a plurality of sections which may be successively isolated and removed from service and then cleaned by reversal of fluid flow without interruption of service through the remaining sections, the combination of a line for supplying cleaning fluid, a line for discharging the material removed by the straining element, a booster pump in the cleaning fluid supply line for controlling the flow therethrough, a motor for operating said pump, and a pilot mechanism subject to the difference in pressure between the two sides of the straining element, said pilot mechanism being adapted to initiate operation of said motor so as to cause said pump to deliver cleaning fluid through said supply line when the difference in pressure exceeds a predetermined standard and to stop the motor so as to discontinue said supply when said standard is again attained.

2. In straining equipment wherein the straining element is composed of a plurality of sections which may be successively isolated and removed from service and then cleaned by reversal of fluid flow without interruption of service through the remaining sections, the combination of a line for supplying cleaning fluid, a line for discharging the material removed by the straining element, means in the supply line for controlling the supply of cleaning fluid, and means for opening said control means when the difference in pressure between the two sides of the straining element exceeds a predetermined standard, together with means adapted to maintain a positive pressure on the material removed by the straining element to hold it against the straining element while said element is in the back-washing zone when cleaning is not being effected.

3. Straining equipment comprising, in combination, a casing having inlet and outlet means for the fluid to be strained, a rotary strainer member arranged in the path of flow, a pair of oppositely-disposed clean-out boxes against the path of movement of said rotary member, means for supplying washing fluid to one of said clean-out boxes and discharging it through the other, the direction of flow of the washing fluid being opposite to the direction of flow of the fluid to be cleaned, a motor driven valve in the cleaning fluid supply line for controlling the flow of fluid through the washing fluid inlet, and a pilot mechanism for controlling the motor of said control valve, said pilot mechanism being subject to the effect of the difference in pressure between the two sides of the straining member, whereby said valve may be opened when the difference in pressure exceeds a predetermined standard and closed when the difference in pressure falls below said standard.

4. Straining equipment comprising, in combination, a casing having inlet and outlet means for the fluid to be strained, a rotary strainer member arranged in the path of flow, a pair of oppositely-disposed clean-out boxes in the path of movement of said rotary member, means for supplying washing fluid to one of said clean-out boxes and discharging it through the other, the direction of flow of the washing fluid being opposite to the direction of flow of the fluid to be cleaned, a motor driven valve in the cleaning fluid supply line for controlling the flow of fluid through the washing fluid inlet, and a pilot mechanism for controlling the motor of said control valve, said pilot mechanism being subject to the effect of the difference in pressure between the two sides of the straining member, whereby said valve is opened when the difference in pressure exceeds a predetermined standard and closed when the difference in pressure falls below said standard, together with a fluid trap in the discharge line for the washing fluid arranged to maintain a positive pressure on the strained material in the cleaning zone during periods when no cleaning is desired.

5. In straining equipment, a rotary straining element composed of a plurality of sections, means for successively isolating and removing strainer sections from service and then cleaning said sections by reversal of fluid flow without interruption of service through the remaining sections, a line for supplying cleaning fluid, said line receiving its supply from the outlet side of the straining equipment, a line for discharging the material removed by the straining element, a booster pump in the cleaning fluid supply line, a motor for operating said pump, and a pilot mechanism subject to the difference in pressure between the two sides of the straining element, said pilot mechanism being adapted to initiate operation of said motor so as to cause said pump to deliver cleaning fluid through said supply line when the difference in pressure exceeds a predetermined standard and to stop the motor so as to discontinue said supply when said standard is again attained.

6. In straining equipment, a rotary straining element composed of a plurality of sections, means for successively isolating and removing strainer sections from service and then cleaning said sections by reversal of fluid flow without interruption of service through the remaining sections, a line for supplying cleaning fluid, a line for discharging the material removed by the straining element, a booster pump in the cleaning fluid supply line, a valve in the cleaning fluid supply line, motor means for operating said pump and said valve, and a pilot mechanism subject to the difference in pressure between the two sides of the straining element, said pilot mechanism being adapted to initiate operation of said motor means so as to cause said pump to deliver cleaning fluid through said supply line and simultaneously to open the valve in said supply line when the difference in pressure exceeds a predetermined standard and to stop said motor means so as to discontinue operation of said pump and close said valve when said standard is again attained.

7. In straining equipment wherein the straining element is composed of a plurality of sections which may be successively isolated and cleaned by reversal of fluid flow without interruption of service through the remaining sections, the combination of a line for supplying cleaning fluid, a line for discharging the material removed by the straining element, a booster pump in the cleaning fluid supply line, a valve in the cleaning fluid supply line, motor means for operating said pump and said valve, and control mechanism adapted to initiate operation of said motor means so as to cause said pump to deliver cleaning fluid through said supply line and simultaneously to open the valve in said supply line or to stop said motor means so as to discontinue operation of said pump and simultaneously to close said valve.

8. Straining equipment comprising in combination, a casing having inlet and outlet means for the fluid to be strained, a rotary strainer member arranged in the path of flow, a pair of oppositely disposed clean-out boxes adjacent the path of movement of said rotary member, means for tightly sealing said clean-out boxes against the faces of said rotray strainer member, a line for supplying washing fluid to one of said clean-out boxes, a line for discharging it from the other box, and means in said discharge line adapted to trap a portion of the discharged fluid, said discharge line and said means being arranged so that the surface of the body of trapped fluid lies above the level of the top of the discharge cleaning chamber in the discharge cleaning box.

DANIEL RAYMOND McNEAL.